United States Patent
Crothers et al.

(10) Patent No.: US 11,256,231 B2
(45) Date of Patent: Feb. 22, 2022

(54) OBJECT DESIGN USING MACHINE-LEARNING MODEL

(71) Applicant: THE BOEING COMPANY, Chicago, IL (US)

(72) Inventors: Phillip John Crothers, Hampton East (AU); Carla Elizabeth Reynolds, Shawnee, KS (US); Alexander Rubin, St. Louis, MO (US); Samuel J. Tucker, St. Louis, MO (US); Gregg Robert Bogucki, Saint Charles, MO (US); Joshua David Kalin, Huntsville, AL (US)

(73) Assignee: The Boeing Company, Chicago, IL (US)

( * ) Notice: Subject to any disclaimer, the term of this patent is extended or adjusted under 35 U.S.C. 154(b) by 86 days.

(21) Appl. No.: 16/287,599

(22) Filed: Feb. 27, 2019

(65) Prior Publication Data
US 2020/0272129 A1 Aug. 27, 2020

(51) Int. Cl.
*G05B 19/4099* (2006.01)
*B33Y 50/02* (2015.01)
(Continued)

(52) U.S. Cl.
CPC ........ *G05B 19/4099* (2013.01); *B29C 70/382* (2013.01); *B33Y 50/02* (2014.12);
(Continued)

(58) Field of Classification Search
CPC ....... B29C 70/382; B33Y 50/00; B33Y 50/02; G05B 13/0265; G05B 19/4099;
(Continued)

(56) References Cited

U.S. PATENT DOCUMENTS

2006/0253214 A1 11/2006 Gross
2010/0204815 A1 8/2010 Murrish et al.
(Continued)

FOREIGN PATENT DOCUMENTS

EP 1052586 A2 11/2000

OTHER PUBLICATIONS

"Digital machine learning in composites manufacturing," Inside Composites, https://www.insidecomposites.com/digital-machine-learning-in-composites-manufacturing, retrieved Feb. 27, 2019, 1 pg.
(Continued)

*Primary Examiner* — Michael J Huntley (57) ABSTRACT

A system to aid in design for manufacturing an object includes a processor and a memory configured to store instructions. The processor is configured to receive first data representing a design of the object to be manufactured and second data representing a machine-learning model. The processor is configured to execute the instructions to generate third data using the first data and the second data. The third data indicates at least one of a modification to the design of the object or process conditions for production of the object. The processor is configured to send the design of the object, the process conditions, or both, to a manufacturing tool to enable production of the object. The machine-learning model is representative of production data and based at least partially on one or more of: object features, process parameters, environmental factors, and quality data.

20 Claims, 6 Drawing Sheets

(51) Int. Cl.
  *G06F 30/15* (2020.01)
  *B29C 70/38* (2006.01)
  *G05B 13/02* (2006.01)
  *G06F 119/18* (2020.01)

(52) U.S. Cl.
  CPC ......... *G05B 13/0265* (2013.01); *G06F 30/15* (2020.01); *G05B 2219/33034* (2013.01); *G05B 2219/35134* (2013.01); *G05B 2219/49007* (2013.01); *G06F 2119/18* (2020.01)

(58) Field of Classification Search
  CPC ........... G05B 2219/33034; G05B 2219/35134; G05B 2219/49007; G06F 2119/18; G06F 30/15
  See application file for complete search history.

(56) References Cited

U.S. PATENT DOCUMENTS

| | | | |
|---|---|---|---|
| 2015/0106062 | A1 | 4/2015 | Chen-Keat et al. |
| 2017/0151728 | A1* | 6/2017 | Kunc .................... B29C 70/222 |
| 2018/0341248 | A1* | 11/2018 | Mehr ..................... G06N 20/00 |
| 2019/0005158 | A1 | 1/2019 | Nakhjavani |
| 2019/0299536 | A1* | 10/2019 | Putman ................. G06K 9/6268 |
| 2019/0384274 | A1* | 12/2019 | Bharadwaj ......... G05B 19/4099 |
| 2020/0098195 | A1* | 3/2020 | Jaiswal ................. B29C 64/393 |
| 2020/0147889 | A1* | 5/2020 | Dheeradhada .......... B29C 64/10 |
| 2020/0218241 | A1* | 7/2020 | Soltanmohammadi ...................... G05B 19/41875 |
| 2020/0242496 | A1* | 7/2020 | Salasoo ................ B23K 31/125 |
| 2020/0272127 | A1* | 8/2020 | Roychowdhury ...... G06F 30/27 |
| 2020/0272128 | A1* | 8/2020 | Roychowdhury ..... B33Y 50/02 |

OTHER PUBLICATIONS

Muelaner, Jody, "AI closes the loop for composites manufacturing," https:/www.sae.org/news/2018/06/ai-closes-the-loop-for-composites-manufacturing, retrieved Feb. 27, 2019, 1 pg.

Extended European Search Report for Application No. 19211998.0 dated Mar. 6, 2020, 6 pgs.

* cited by examiner

OBJECT DESIGN USING MACHINE-LEARNING MODEL

FIELD OF THE DISCLOSURE

The present disclosure is generally related to object design and manufacture.

BACKGROUND

Designers of objects to be manufactured may use metrics and tools that focus on performance and that do not focus on production and cost. Conventionally, designers can employ metrics such as cost-per-unit-weight but cannot quantify a design feature for quality or cost consequences to the production system. Existing solutions provide static and limited feedback to the designer regarding consequences of design choices. Use of paper design manuals and guides, if such manuals and guides exist, is frequently not enforced on designers. Although in some circumstances a designer can seek manufacturing feedback, such feedback is typically by post-design signature loops or, more often, via an informal communication with a manufacturing engineer that cannot feasibly know the consequence of all design decisions on every aspect of the production system. Thus, many designs are non-ideal for production producibility and cost.

The production system is often only formed after the design process has progressed to a certain stage. The design can sometimes be incrementally adjusted if the project schedule allows. Frequently, the outcome is a production result that is non-ideal in terms of quality and cost. In addition, because specifications and quality documents are updated and released on a relatively slow update schedule, such documents typically do not represent the state of the art.

SUMMARY

In a particular implementation, a system to aid in design for manufacturing an object includes a processor and a memory configured to store instructions. The processor is configured to receive first data representing a design of the object to be manufactured and second data representing a machine-learning model. The processor is configured to execute the instructions to generate third data using the first data and the second data. The third data indicates at least one of a modification to the design of the object or process conditions for production of the object. The processor is configured to send the design of the object, the process conditions, or both, to a manufacturing tool to enable production of the object. The machine-learning model is representative of production data and based at least partially on one or more of: object features, process parameters, environmental factors, and quality data.

In another particular implementation, a method for manufacturing an object includes using a processor to perform the steps of receiving first data representing a design of the object to be manufactured and obtaining second data representing a machine-learning model. The machine-learning model is representative of production data and based at least partially on one or more of: object features, process parameters, environmental factors, and quality data. The method also includes using the processor to perform the steps of generating third data using the first data and the second data, where the third data indicates at least one of a modification to the design of the object or process conditions for production of the object, and sending the design of the object, the process conditions, or both, to a manufacturing tool to enable production of the object.

In another particular implementation, a computer-readable medium stores instructions executable by a processor to enable production of an object by performing steps including receiving first data representing a design of the object to be manufactured and obtaining second data representing a machine-learning model. The machine-learning model is representative of production data and based at least partially on one or more of: object features, process parameters, environmental factors, and quality data. The steps also include generating third data using the first data and the second data, where the third data indicates at least one of a modification to the design of the object or process conditions for production of the object, and sending the design of the object, the process conditions, or both, to a manufacturing tool to enable production of the object.

The features, functions, and advantages described herein can be achieved independently in various implementations or may be combined in yet other implementations, further details of which can be found with reference to the following description and drawings.

DETAILED DESCRIPTION

Aspects disclosed herein present systems and methods for object design using a machine-learning model. Design data for an object to be manufactured can be analyzed based on the machine-learning model and modifications can be suggested or automatically applied to the design to reduce production cost, reduce an anticipated defect rate, improve one or more other factors associated with manufacturing the object, or any combination thereof. The machine-learning model can be updated based on real-time or near-real-time production data based on recent production events, such as in a globally dispersed production environment.

A technical effect and aspects of the disclosed systems and methods can provide live updates on direct and indirect consequence of design decisions for part cost and production system cost, including analysis on design feature criteria for the manufacturing process (e.g., geometry, stock, etc.) and assembly (e.g., form, fit and tolerances, etc.). Real-time data can be used, such as from operations and teardown labs, and machine learning techniques can be applied to provide feedback to a designer on up-to-date performance of processes for quality, cost, and production integration decisions.

In parallel, specification and quality systems can be updated frequently, using machine learning, to represent the state of the art for use by designers and quality analysis. According to some aspects, the system provides direct analysis of the design using such updated data and specifications implemented within design tools used by designers to create designs. In this manner, designers are enabled and encouraged to consider cost and manufacturing consequences, in addition to product performance (e.g., weight and function), when designing parts for manufacture. Accordingly, consequences impacting producibility and cost that arise from the lack of feedback from actual production runs and delays associated with updating specification and quality documents in conventional design processes can be reduced or eliminated by use of the disclosed systems and methods.

In addition, aspects of the present disclosure enable environmental factors of a manufacturing facility to be taken into account at a design stage, a production stage, or both. For example, production quality can be affected due to changes in factors such as ambient temperature and humidity on a factory floor. According to some aspects, the system adjusts design analysis of an object to be manufactured based on actual or predicted environmental conditions at a manufacturing facility and can generate design modifications, adjust processing parameters to be used during manufacturing the object, or a combination thereof, to increase production quality and reduce an occurrence of defects in a production run.

The figures and the following description illustrate specific exemplary embodiments. It will be appreciated that those skilled in the art will be able to devise various arrangements that, although not explicitly described or shown herein, embody the principles described herein and are included within the scope of the claims that follow this description. Furthermore, any examples described herein are intended to aid in understanding the principles of the disclosure and are to be construed as being without limitation. As a result, this disclosure is not limited to the specific embodiments or examples described below, but by the claims and their equivalents.

Particular implementations are described herein with reference to the drawings. In the description, common features are designated by common reference numbers throughout the drawings. In some drawings, multiple instances of a particular type of feature are used. Although these features are physically and/or logically distinct, the same reference number is used for each, and the different instances are distinguished by addition of a letter to the reference number. When the features as a group or a type are referred to herein (e.g., when no particular one of the features is being referenced), the reference number is used without a distinguishing letter. However, when one particular feature of multiple features of the same type is referred to herein, the reference number is used with the distinguishing letter. For example, referring to FIG. 1, multiple designs are illustrated and associated with reference numbers 120A and 120B. When referring to a particular one of these designs, such as the design 120A, the distinguishing letter "A" is used. However, when referring to any arbitrary one of these designs or to these designs as a group, the reference number 120 is used without a distinguishing letter.

As used herein, various terminology is used for the purpose of describing particular implementations only and is not intended to be limiting. For example, the singular forms "a," "an," and "the" are intended to include the plural forms as well, unless the context clearly indicates otherwise. Further, the terms "comprise," "comprises," and "comprising" are used interchangeably with "include," "includes," or "including." Additionally, the term "wherein" is used interchangeably with the term "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

As used herein, "generating", "calculating", "using", "selecting", "accessing", and "determining" are interchangeable unless context indicates otherwise. For example, "generating", "calculating", or "determining" a parameter (or a signal) can refer to actively generating, calculating, or determining the parameter (or the signal) or can refer to using, selecting, or accessing the parameter (or signal) that is already generated, such as by another component or device. As used herein, "coupled" can include "communicatively coupled," "electrically coupled," or "physically coupled," and can also (or alternatively) include any combinations thereof. Two devices (or components) can be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled can be included in the same device or in different devices and can be connected via electronics, one or more connectors, or inductive coupling, as illustrative, non-limiting examples. In some implementations, two devices (or components) that are communicatively coupled, such as in electrical communication, can send and receive electrical signals (digital signals or analog signals) directly or indirectly, such as via one or more wires, buses, networks, etc. As used herein, "directly coupled" is used to describe two devices that are coupled (e.g., communicatively coupled, electrically coupled, or physically coupled) without intervening components.

Figure 1:
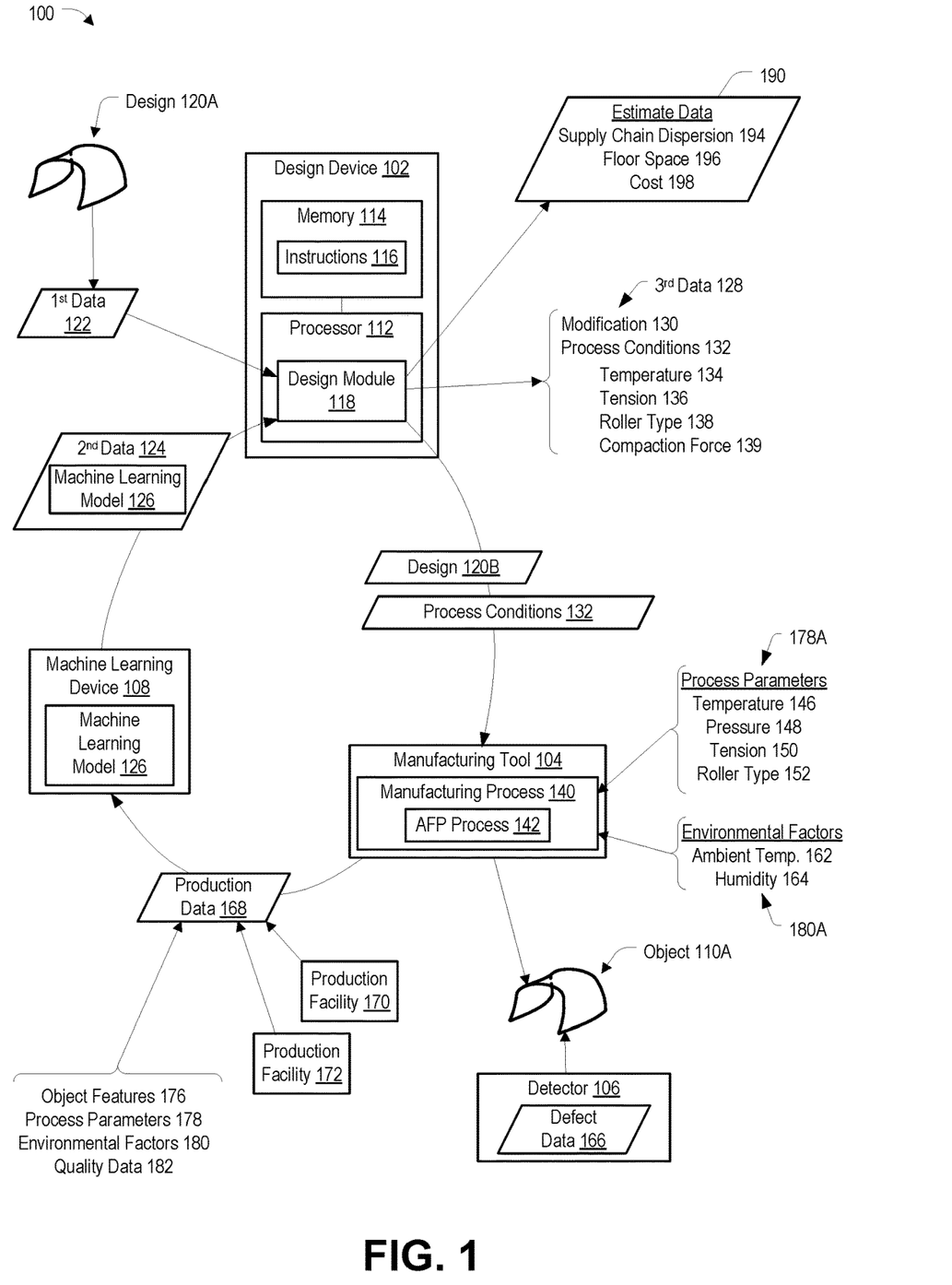
FIG. 1 is a diagram that illustrates a system configured to aid in design of an object based on a machine-learning model.
Figure 3:
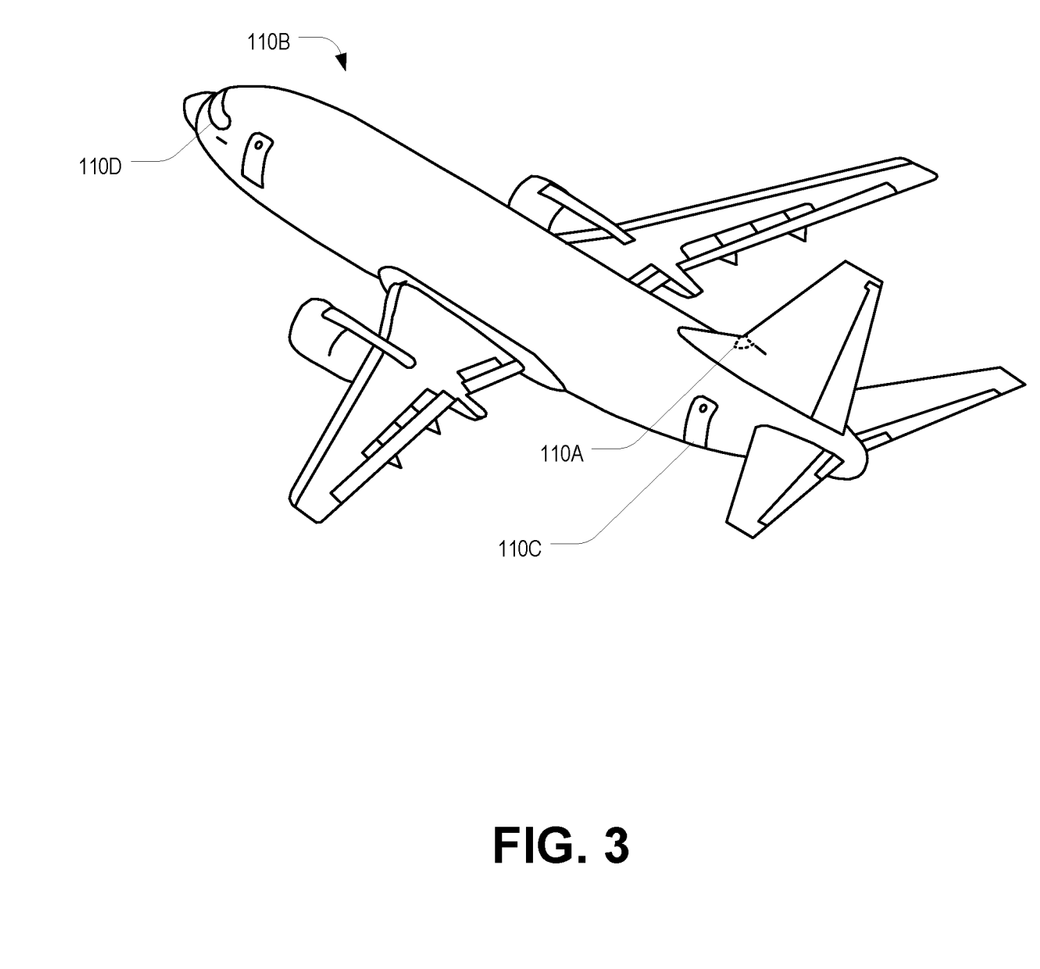
FIG. 3 is a diagram of a particular implementation of an object produced by the system of FIG. 1.

FIG. 1 depicts an example of a system 100 that is configured to apply machine learning to update and improve a manufacturing process. The system 100 includes a design device 102, a manufacturing tool 104, a detector 106, and a machine learning device 108. The system 100 is configured to apply a machine-learning model 126 based on production data to modify or supplement a design of an object 110 to be manufactured, illustrated in FIG. 1 as an object 110A that is a component of another item to be manufactured, such as a component of an airplane as illustrated in FIG. 3. Alternatively, the object 110 can be a ship, car, or other vehicle or structure, or a component of a vehicle or structure as illustrative, non-limiting examples. Alternatively or additionally, the object 110 to be manufactured can be an item that is assembled from other manufactured components that are produced at globally distributed manufacturing locations and transported to an assembly location. The object 110 can be any type of physical component to be manufactured, such as via a composite process (e.g., an automated tape laying (ATL) or automated fiber placement (AFP) process) or a non-composite process (e.g., an additive manufacturing process, such as three-dimensional (3D) printing, or a subtractive manufacturing process, such as machining). The modified design and supplemental process information is used during manufacturing of the object 110, and resulting production data is used to update the machine-learning model 126. Modifying or augmenting a design of an object 110 using of the machine-learning model 126 enables the object 110 to be produced with reduced production costs and fewer defects as compared to using a conventional design that is not based on machine learning feedback from a production system.

The design device 102, the manufacturing tool 104, the detector 106, and the machine learning device 108 are interconnected via one or more networks to enable data communications. For example, the design device 102 is coupled to the manufacturing tool 104 via one or more wireless networks, one or more wireline networks, or any combination thereof. Two or more of the design device 102, the manufacturing tool 104, and the machine learning device 108 can be co-located or geographically distributed from each other.

The design device 102 includes a processor 112 coupled to a memory 114. The memory 114 includes a computer-readable medium that stores instructions 116 that are executable by the processor 112. The instructions 116 are executable to initiate, perform or control operations to aid in design and/or manufacture of the object 110, illustrated as the object 110A (e.g., an airplane component).

The processor 112 includes a design module 118 that can be implemented at least in part by the processor 112 executing the instructions 116. The processor 112 can be implemented as a single processor or as multiple processors, such as in a multi-core configuration, a multi-processor configuration, a distributed computing configuration, a cloud computing configuration, or any combination thereof. In some implementations, one or more portions of the design module 118 are implemented by the processor 112 using dedicated hardware, firmware, or a combination thereof.

The processor 112 is configured to receive first data 122 representing a design 120A of the object 110A to be manufactured. For example, the design 120A may be provided by a designer operating the design device 102. To illustrate, the design 120A can be graphically generated by the designer via a graphical user interface (GUI), generated based on non-graphical data, such as a collection of points representing surface data or a set of geometric parameters (e.g., dimensions, orientations, and locations of components), or a combination thereof. In some implementations, the first data 122 is graphically generated design data received from the designer via the GUI, non-graphical design data received from the designer (e.g., via a keyboard), or a combination thereof. In some implementations, the first data 122 can be retrieved from one or more stored files, such as a computer-aided design (CAD) model file. In an illustrative example, the first data 122 includes a CAD model of the design 120A or a portion of a CAD model of the design 120A.

The processor 112 is also configured to receive second data 124 that represents the machine-learning model 126. As described further below, the machine-learning model 126 is representative of production data and can be based at least partially on object features, process parameters, environmental factors, and quality data, as described further below.

The processor 112, via operation of the design module 118 and based on the first data 122 and the second data 124, is configured to automatically generate third data 128 indicating at least one of a modification 130 to the design 120A of the object 110A or process conditions 132 for production of the object 110A. In an example, the design module 118 is configured to analyze the first data 122 in light of the machine-learning model 126 to determine one or more of a cost associated with production of the design 120A, one or more geometric feature of the design 120A that is determined to be associated with defects, an estimated defect rate for manufacture of the object 110A based on the design 120A, one or more other factors associated with manufacturing the object 110A based on the design 120A, or any combination thereof. Based on such factors, the design device 102 can propose the modification 130 to the designer, such as via a prompt at a graphical user interface. The modification 130 can include adjusting at least one of an object geometry or a ply angle, as described further with reference to FIG. 2.

In some implementations, the design device 102 is configured to generate estimate data 190 that can be presented to a designer or an operator of the design device 102 to provide feedback in the form of estimates associated with production factors. In a particular implementation, the estimate data 190 is indicative of a supply chain dispersion estimate 194, a floor space estimate 196, a cost estimate 198, or a combination thereof, based on the design 120 and the second data 124 (e.g., the estimate data 190 results from application of the machine-learning model 126 to the design 120). The supply chain dispersion estimate 194 can include an estimate of how geographically dispersed are the elements that are used to manufacture the object 110A (the "supply chain"), which can provide an indication of cost or time associated with retrieval of the elements from geographically distant locations to manufacture the object 110A. The floor space estimate 196 can include an estimate of how large of an area of a factory floor, or what portion of available factory space or equipment, is predicted to be used for manufacture of the object 110A, which can provide an indication of opportunity cost associated with manufacturing the object 110A. The cost estimate 198 can include an estimate of a total cost of manufacture of the object 110A and can include costs associated with parts, materials, and labor associated with manufacturing the object 110A, as illustrative, non-limiting examples. The operator of the design device 102 can generate one or more updates to the design 120A to reduce one or more of the supply chain dispersion estimate 194, the floor space estimate 196, or the cost estimate 198 in light of the current manufacturing production data represented by the machine-learning model 126.

The processor 112 is configured to send a design 120B of the object 110A, the process conditions 132, or both, to the manufacturing tool 104. The design 120B of the object 110A and the process conditions 132 enable production of the object 110A at the manufacturing tool 104. The design 120B can be unmodified relative to the design 120A, such as when no modifications to the design 120A are indicated based on the machine-learning model 126. Alternatively, the design 120B can include a modified version of the design 120A after incorporation of the modification 130 or after other changes made by a designer. For example, in some implementations, the design device 102 generates one or more messages based on the third data 128 for the designer to indicate the proposed modification 130 to the design 120A. Alternatively, in some implementations, the design device 102 automatically applies the modification 130 to the design 120A prior to sending the design 120B to the manufacturing tool 104. Additional examples of operation of the design module 118 are provided with reference to FIG. 2.

The manufacturing tool 104 is configured to apply a manufacturing process 140 to generate the object 110A. In an illustrative example, the manufacturing process 140 includes an automated fiber placement (AFP) process 142. The AFP process 142 can be performed according to one or more process parameters 178A such as temperature 146, pressure 148, tension 150, or roller type 152. The AFP process 142 is also affected by one or more environmental factors 180A, such as ambient temperature 162 or humidity 164. In some implementations, the process parameters 178A are determined based on the process conditions 132 that are provided by the design device 102, such as a temperature 134, a tension 136, a roller type 138, a compaction force 139, or any combination thereof, that are determined by the design device 102 as conducive to reduced defects, costs, or other criteria. One or more of the process parameters 178A used by the manufacturing tool 104 can include default parameters or can be set by an operator of the manufacturing tool 104.

In an illustrative example, the process parameters 178A correspond to adjustable parameters used during the AFP process 142, with the temperature 146 indicating a resin temperature, the pressure 148 indicating a pressure applied by a fiber placement head during placement of a tow, the tension 150 indicating an amount of controlled tension maintained on a tow by the fiber placement head, and the roller type 152 indicating a type of compaction roller used by the fiber placement head. In addition to the process parameters 178A, the environmental factors 180A can also affect a defect rate associated with the AFP process 142. As a non-limiting example, the ambient temperature 142 indicates a room temperature in the vicinity of the AFP machine that generates the object 110A, and the humidity 164 indicates a humidity in the vicinity of the AFP machine.

In some implementations, one or more of the process parameters 178A are determined based on the process conditions 132, which can be updated for each production run of the object 110A without changing the design 120B. A first design/production feedback sub-loop can be used to determine the process conditions 132 for each production run for the object 110A, in real-time or iteratively, in conjunction with production floor feedback or a designer or modifier. To illustrate, multiple production runs can be performed at the manufacturing tool 104. Each production run can receive updated process conditions 132 from the design device 102 without modification to the design 120B. The process parameters 178A can be changed directly between production runs due to the updates to the process conditions 132. In addition or alternatively, a second design/production feedback sub-loop can be used in which the process parameters 178A can be changed by the machine-learning model 126 on the fly, during processing, such as according to ambient conditions (e.g., the environmental factors 180).

The detector 106 is configured to examine the object 110A after fabrication to determine defect data 166. For example, the defect data 166 may indicate one or more observed defects, such as locations, numbers, and types of the observed defects. To illustrate, defects that can be observed for the AFP process 142 can include folds, puckers, twisted tows, wrinkles, and wandering tows, as illustrative, non-limiting examples.

The machine learning device 108 is configured to generate and update the machine-learning model 126 based on received production data 168. The received production data 168 includes information such as object features 176, process parameters 178, environmental factors 180, and quality data 182. For example, the object features 176 can include descriptions of regions of curvature of the object 110A, a ply angle of the object 110A, one or more other features, or combination thereof. The process parameters 178 can include the process parameters 178A used during manufacturing of the object 110A, the environmental factors 180 can include the environmental factors 180A present during manufacturing of the object 110A, and the quality data 182 can be representative of the defect data 166 that is generated upon inspection of the object 110A (e.g., the quality data 182 includes data indicative of observed defects in produced objects).

In some implementations, the production data 168 includes globally dispersed production data. For example, in addition to production data from the manufacturing tool 104, the production data 168 can also include data provided by distributed manufacturing locations 170, 172. To illustrate, the manufacturing locations 170 and 172 can be in different geographic areas from the location of the manufacturing tool 104.

The machine learning device 108 is configured to train the machine-learning model 126 based on received production data 168. Training the machine-learning model 126 based on most recent production data 168 causes the machine-learning model 126 to represent the current state of production and manufacturing facilities of the system 100. In some implementations, the machine-learning model 126 is continuously updated as globally dispersed production data 168 is received in a near-instantaneous or real-time manner.

In an illustrative example, a designer using the design device 102 may be located in California when generating the design 120A, and the manufacturing tool 104 to manufacture the object 110 may be in a manufacturing plant in China. Although the designer may not be aware of the ambient temperature and humidity in the manufacturing plant, or how the ambient temperature and humidity in the manufacturing plant can impact the production of the object 110A (e.g., affecting the defect rate during a production run in the manufacturing plant), the machine learning model 126 can guide a modification 130 to the design 120A, one or more values of the process conditions 132-139, or both, based on current environmental conditions in the manufacturing plant. For example, the production data 168 may indicate that, based on recent production runs at the current environmental conditions at the manufacturing plant, using a lower resin temperature (e.g., the temperature 134) and a higher fiber placement head compaction force (e.g., the compaction force 139) results in a lower defect rate as compared to using default values.

Accordingly, the system 100 includes a mechanism for the current production data to be used in analyzing and modifying the design 120, to improve one or more production factors such as required floor space, predicted defect rate, cost of materials, cost of manufacturing, or one or more factors that conventionally are not readily available to a designer. The manufacturing tool 104 is operated based on the output of the design device 102 to generate the object 110A, and the production data corresponding to the object 110A, such as the object's features, process parameters, and quality measurements are used to further update the machine-learning model 126.

Although FIG. 1 depicts the design device 102 interoperative with the manufacturing tool 104, the detector 106, and the machine learning device 108, within the system 100, it should be understood that each of the components of the system 100 can function independently of one or more, or all, of the other components of the system 100. For example, in some implementations, the design device 102 can be operated as part of a design-only shop that receives data representative of a machine-learning model (e.g., the second data 124) but that is otherwise independent of any particular manufacturing or production facility. As another example, in some implementations, the manufacturing tool 104 can be operated as part of a manufacturing or production facility that is independent of any particular design shop. As yet another example, in some implementations, the machine learning device 108 can be operated by a provider of artificial intelligence (AI) services that is otherwise independent of any particular design shop or manufacturing or production facility.

Although the design device 102, the manufacturing tool 104, the detector 106, and the machine learning device 108 are depicted as separate components, in other implementations the described functionality of two or more of the design device 102, the manufacturing tool 104, the detector 106, and the machine learning device 108 can be performed by a single component. In some implementations, each of the design device 102, the manufacturing tool 104, the detector 106, and the machine learning device 108 can be represented in hardware, such as via an application-specific integrated circuit (ASIC) or a field-programmable gate array (FPGA), or the operations described with reference to the elements may be performed by a processor executing computer-readable instructions.

Although FIG. 1 illustrates particular examples for clarity of explanation, such examples are not to be considered as limitations. For example, although the manufacturing process 140 is described as including the AFP process 142, in other examples the manufacturing process includes one or more other processes, in addition to, or instead of, the AFP process 142, such as another composite process (e.g., automated tape laying (ATL)) or a non-composite process (e.g., an additive manufacturing process, such as three-dimensional (3D) printing, a subtractive manufacturing process, such as machining, one or more other manufacturing processes, or any combination thereof). Because the third data 128, the process parameters 178A, and the environmental factors 180A are provided as examples for use with the AFP process 142, in implementations in which a manufacturing process other than the AFP process 142 is used, the third data 128, the process parameters 178A, and the environmental factors 180A can be modified to include parameters and factors that are more relevant and to omit parameters and factors that are less relevant to the particular manufacturing process.

Figure 2:
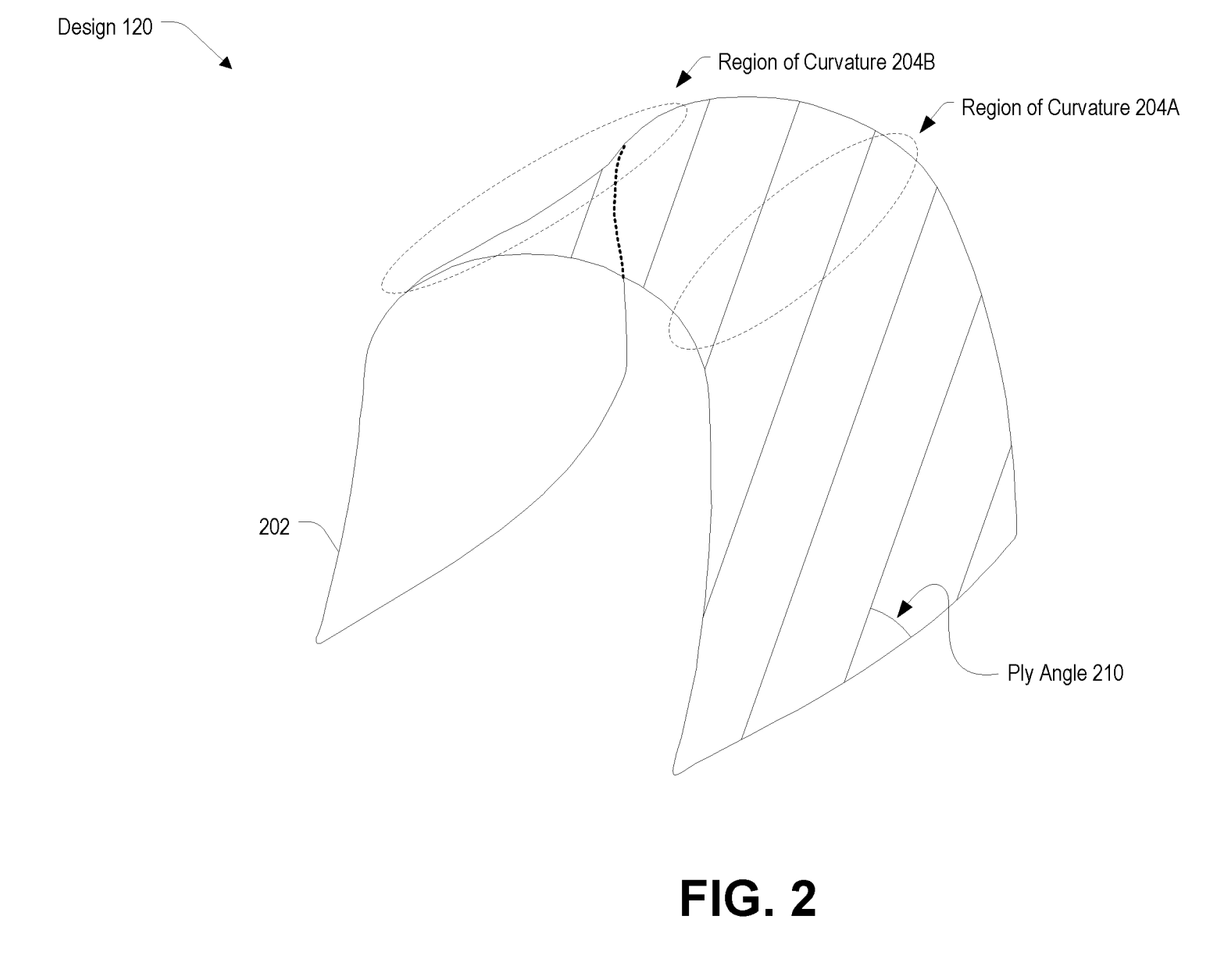
FIG. 2 is a diagram of a particular implementation of the design of FIG. 1.

FIG. 2 illustrates a graphical representation of a particular implementation of the design 120. As illustrated, the design 120 has an object geometry 202 that is similar to a planar rectangular sheet that has been bent into approximately a U-shape (also sometimes referred to as a "saddle" shape). The curvature of the sheet is non-uniform, with two regions of curvature 204A, 204B indicating regions of higher curvature than other regions of the design 120. As illustrated, in addition to curvature along the U-shape (e.g., curvature along the length of the rectangular sheet), the design 120 also exhibits curvature in one or more other dimensions (e.g., curvature along the width of the rectangular sheet).

The design 120 also includes a ply angle 210. As illustrated, the ply angle 210 indicates an angular orientation of tows that form a ply of a composite material, such as in the automated fiber placement process 142 of FIG. 1. In a multi-ply material, each ply may have a different ply angle, such as by incrementing the ply angle for each ply by 45 degrees relative to the ply angle of the previous ply, to enhance a structural integrity of the object 110A. The ply angle 210 can represent an initial ply angle of the design 120 from which the ply angles for each subsequent ply is determined. Although in some implementations the plies are layered to cover the same area, in other implementations individual plies cover different areas than other plies and can form patches or partial covering of the whole shape. Such patches do not necessarily correspond to any of the previous or following plies in the location, size or angle.

In some implementations, defects are statistically more likely to occur in regions of higher curvature, and the likelihood of a defect is affected by the ply angle 210. For example, a tow can be predicted to be more likely to buckle in a design in which the tow is placed across the region of curvature 204A at a 45-degree angle to the gradient of the object's surface at the region of curvature 204A (e.g., as illustrated) as compared to a design in which the tow crosses the region of curvature 204A parallel to the gradient (e.g., a design in which the ply angle 210 is approximately 90-degrees).

Using the design 120 of FIG. 2 as an example, operation of the design device 102 of FIG. 1 according to a particular implementation includes the design module 118 receiving the first data 122 and running a classifier on the first data 122 representing the design 120A (to determine whether one or more modifications would reduce an estimated defect rate associated with manufacturing the object 110A. For example, the second data 124 can include a classifier (e.g., a set of weights that define a trained neural network) that is based on the machine-learning model 126 and that is configured to detect when a relationship between the ply angle 210 and the curvature at the regions of curvature 204A and 204B is indicative of an estimated defect rate exceeding a threshold amount. To illustrate, the design module 118 can perform a series of computations including scanning the design 120A and generating feature data corresponding to the design 120 (e.g., generate surface gradient data, edge data, data associated with other features such as protrusions, holes, etc., or any combination thereof), feeding the feature data into the classifier, and selectively identifying a modification to the design 120A based on an output of the classifier.

For example, if the output of the classifier indicates that an estimated defect rate is within acceptable limits (e.g., is less than or equal to a threshold amount), the design module 118 can bypass generating a modification. Otherwise, if the output of the classifier indicates that the estimated defect rate is outside of acceptable limits (e.g., is above the threshold amount), the design module 118 can generate a suggested modification, such as by identifying a source of potential defects (e.g., "The curvature is too large at this ply angle.") for the designer to accommodate by applying changes to the design 120A.

In some implementations, the design module 118 generates a proposed design change as the modification 130 (e.g., "Increasing the ply angle to 60 degrees would increase manufacturing yield to an acceptable level."). In some examples, after the classifier detects that the design 120A has an estimated defect rate above the threshold amount, the design module 118 automatically tests alternative designs to identify one or more modification that would reduce the estimated defect rate to below the threshold amount. For example, the design module 118 can iteratively adjust the ply angle 210 in 5-degree increments and generate updated test designs that match the geometry 202 of the design 120A but that use the incremented values of the ply angle 210. The design module 118 can run the classifier on each of the test designs to identify one or more designs that have an estimated defect rate below the threshold level and can determine the value(s) of the ply angle 210 of the identified design(s).

In some implementations, the design module 118 can generate test designs by adjusting multiple parameters to identify combinations of changes to the design 120A that result in a decreased estimated defect rate. For example, the design module 118 can adjust (e.g., reduce) the curvature at the first region of curvature 204A, at the second region of curvature 204B, or both, in addition to (or instead of) adjusting the ply angle 210. Thus, the design module 118 can be configured to perform a search process, such as steepest descent search, that includes adjusting values of multiple parameters to locate one or more sets of values of the parameters that result in an estimated defect rate that is less than the threshold amount.

In some implementations, the design module 118 informs the user of the design device 102 of the identified ply angle value(s), curvature adjustment(s), other suggested parameter changes, or a combination thereof, as a proposed modification to the design 120A (e.g., the modification 130). In some implementations, the design module 118 prompts the user of the design device 102 of the proposed modification to the design 120A and automatically updates the design 120A to generate the design 120B in response to the user approving the modification 130. In some implementations, the design module 118 automatically adjusts the design 120A to implement the modification 130 and generates the design 120B without first requesting and receiving the user's approval.

Although described with reference to estimated defect rate, it should be understood that in other implementations the design module 118 can apply one or more other classifiers to detect other factors in addition to, or in place of, a classifier that detects an estimated defect rate based on geometry and ply angle. For example, the second data 124 can include data based on the machine-learning model 126 that represents classifiers for production spatial criteria, supply chain dispersion, floor space, cost, one or more other factors, or any combination thereof. In a manner similar as described above with reference to the estimated defect rate based on the geometry 202 and the ply angle 230, the design module 118 can be configured to run various classifiers on the design 120 and to adjust the design 120 to determine values of design parameters, the process conditions 132, or a combination thereof, to satisfy various criteria. As a result, the design 120B that is used for the manufacturing process 140 can be improved with respect to defect rate, production cost, floor space, etc., as compared to the initial design 120A.

FIG. 3 is a diagram illustrating an example of an object 110B that can be manufactured based on the machine-learning systems and techniques described with reference to the system 100. As illustrated, the object 110B is an aircraft that includes an assemblage of multiple components, such as the object 110A (e.g., a panel), a door 110C, and a window 110D (as representative, non-limiting examples), each of which can be produced by the manufacturing tool 104 or produced at one or more of the production facilities 170-172 and transported to a central facility for assembly. Although the object 110B is depicted as an aircraft, in other implementations the object 110B is another type of vehicle, such as a spacecraft, a watercraft, or a land-based vehicle, a structure, such as an aircraft hanger, an office building, or a bridge, or another type of object.

Figure 4:
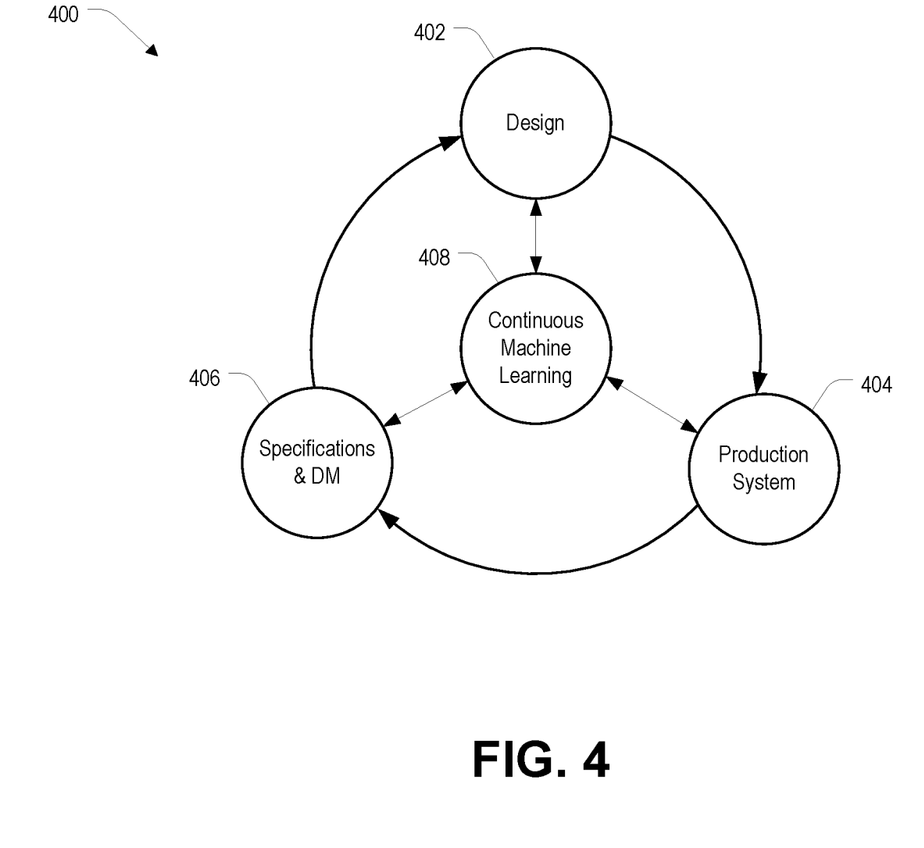
FIG. 4 is a diagram illustrating a particular implementation of a production process based on the machine-learning model of FIG. 1.

FIG. 4 is a diagram illustrating a particular implementation of a production process 400 based on the machine-learning model of FIG. 1. The production process 400 includes a design stage 402, a production system stage 404, and a specifications and design manual ("DM") stage 406. Each of the stages 402-406 is coupled to a continuous machine learning stage 408. In a particular implementation, the design stage 402 includes the design device 102, the production system stage 404 includes the manufacturing tool 104 and the manufacturing locations 170, 172, and the machine learning stage 408 includes the machine learning device 108.

The design stage 402 can be configured as "design for X", where X represents one or more design targets, such as manufacturing, assembly process capability/control, cost, etc. The design stage 402 can enforce "manufacturing allowables" via part definitions, production systems definition, and continuously learning specifications. The design stage 402 can be implemented as an expanded project management software tool for design and continuous learning that can access actual manufacturing data and process information, link to production systems (e.g., reuse) of the production system stage 404, implement data formatting for continuous learning of the continuous machine learning stage 408, and provide relevant feedback for designers. Such project management software tool may be for example SEER® as available from the Galorath Corporation of El Segundo, Calif.

The production system stage 404 can be modelled as a physical layout and value stream (cost and flow), including preferred supply chain. The value stream and layout can be continuously updated according to design decisions and can provide relevant feedback for designers at the design stage 402. As a non-limiting example, designer feedback can include information such as "20 other designs use prepreg, using thermoplastic requires extra equipment—value [X] and floor space," such as a combination of the estimate data 190 and the modification 130 of FIG. 1. Live evaluation of design decisions can include factors such as spatial requirements, supply chain, dispersion, floor space, or topline product or sub-assembly data cost, as illustrative, non-limiting examples.

The specifications and DM stage 406 can include updates and revisions to specifications, DMs, D6, and quality control documents, as illustrative, non-limiting examples. For example, specifications that are conventionally implemented as immovable hard limits that are only infrequently updated (e.g., annually or less frequently) can be continuously updated by production learning and targeted testing. To illustrate, as production techniques and equipment are updated, immediate or near-immediate updates to specifications can be promulgated via updated data provided to and processed by the continuous machine learning stage 408. The updated specifications can be used to guide and constrain designs for new objects 110 to be manufactured, such as via one or more updated classifiers provided via the second data 124 of FIG. 1 that are used to classify the design 120A as compliant or non-compliant with the specification.

The production process 400 can provide a process control loop to connect variations in process to the quality (or defects) of a part that is manufactured according to the variations. The production process 400 can provide a basis for accelerated point design qualification, data for offline machine learning experiments (e.g., accelerated cure, high-entropy alloy changes), and relevant live feedback for a designer, and can further provide a predictive feature for the designer.

By interfacing the continuous machine learning stage 408 with updates from the production system stage 404 and applying updated machine learning data to the specifications and DM stage 406 and the design stage 402, the production process 400 provides an architecture and working mechanism to enable a continuously learning system and feedback loops for design for manufacturing, assembly, process capability, cost of detailed part and cost of production system.

Figure 5:
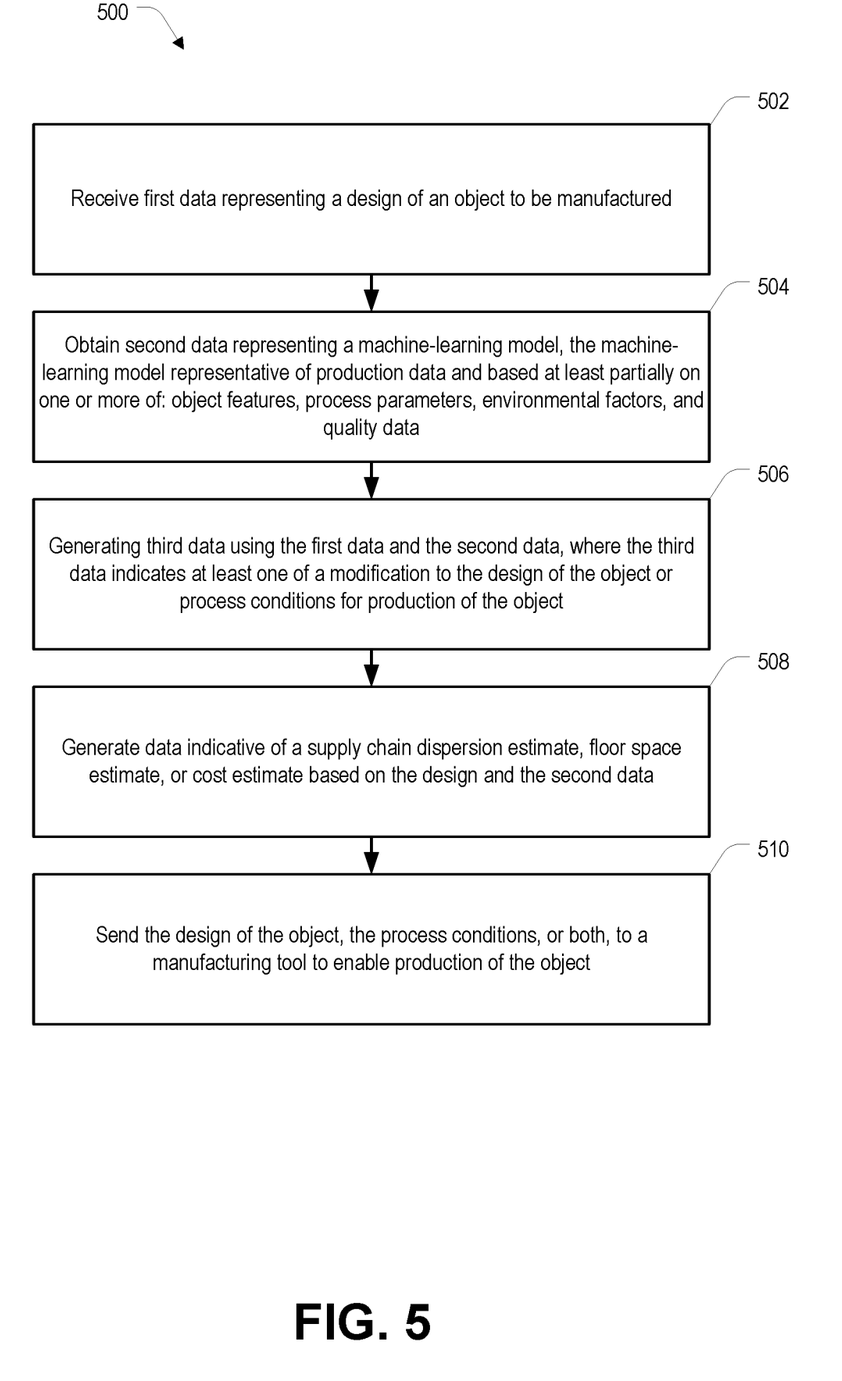
FIG. 5 is a diagram that illustrates a flow chart of an example of method of aiding in the design of an object that can be performed by the system of FIG. 1.

FIG. 5 depicts an example of a method 500 for manufacturing an object and includes using a processor to perform steps. In a particular implementation, the method 500 is performed by the design device 102 of FIG. 1.

The method 500 includes receiving first data representing a design 120 of an object 110 to be manufactured, at 502. To illustrate, the first data 122 representing the design 120A of the object 110A of FIG. 1 is received at the processor 112 of the design device 102.

The method 500 includes obtaining second data representing a machine-learning model, at 504. To illustrate, the second data 124 representing the machine-learning model 126 is received at the processor 112 of the design device 102. In some implementations, the machine-learning model is updated using globally dispersed production data, such as the production data 168 that includes data from the distributed manufacturing locations 170, 172.

The machine-learning model is representative of production data and based at least partially on one or more of: object features, process parameters, environmental factors, and quality data. To illustrate, the machine-learning model 126 is representative of the production data 168 and is based at least partially on the object features 176, the process parameters 178, the environmental factors 180, and the quality data 182. In an illustrative example, the production of the object includes an automated fiber placement (AFP) process, such as the AFP process 142. As illustrated in FIG. 1, the process parameters 178A can include at least one of the temperature 146, the pressure 148, the tension 150, or the roller type 152, the environmental factors 180A can include at least one of the ambient temperature 162 or the humidity 164, and the quality data 182 can include the defect data 166 indicative of observed defects in produced objects 110. The object features 176 can include regions of curvature, such as the regions of curvature 204 of FIG. 2.

The method 500 includes generating third data using the first data and the second data, at 506. The third data indicates at least one of a modification to the design of the object or process conditions for production of the object, at 506. To illustrate, the processor 112 automatically generates the third data 128 indicating at least one of the modification 130 to the design 120A of the object 110A or the process conditions 132 for production of the object 110A. In some implementations, the modification includes adjusting at least one of an object geometry or a ply angle, such as adjusting the object geometry 202 (e.g., by reducing a curvature in the regions of curvature 204) and adjusting the ply angle 220 of FIG. 2. In the implementation of FIG. 1, the process conditions can include the temperature 134, the tension 136, the roller type 138, the compaction force 139, or any combination thereof.

In some implementations, the method 500 includes generating data indicative of a supply chain dispersion estimate, floor space estimate, or cost estimate based on the design and the second data, at 508. To illustrate, the processor 112 can generate the estimate data 190 indicative of the supply chain dispersion estimate 194, the floor space estimate 196, or the cost estimate 198.

The method 500 includes, at 510, sending the design of the object, the process conditions, or both, to a manufacturing tool to enable production of the object. To illustrate, the processor 112 sends the design 120B of the object 110A, the process conditions 132, or both, to the manufacturing tool 104 to enable production of the object 110A.

By using a machine-learning model based on production data to generate design modifications or process conditions for a design of an object, to production factors associated with manufacturing the object can be improved. For example, production factors such as required floor space, predicted defect rate, cost of materials, cost of manufacturing, or one or more factors that conventionally are not readily available to a designer can be evaluated and the design can be modified in view of such production factors. Updating the machine-learning model based on the production data, including the production data associated with manufacturing the object 110, completes a feedback loop or cycle between object design, object manufacture, and the machine-learning model to enable enhanced accuracy and speed of adapting designs to account for changing conditions at production facilities.

Figure 6:
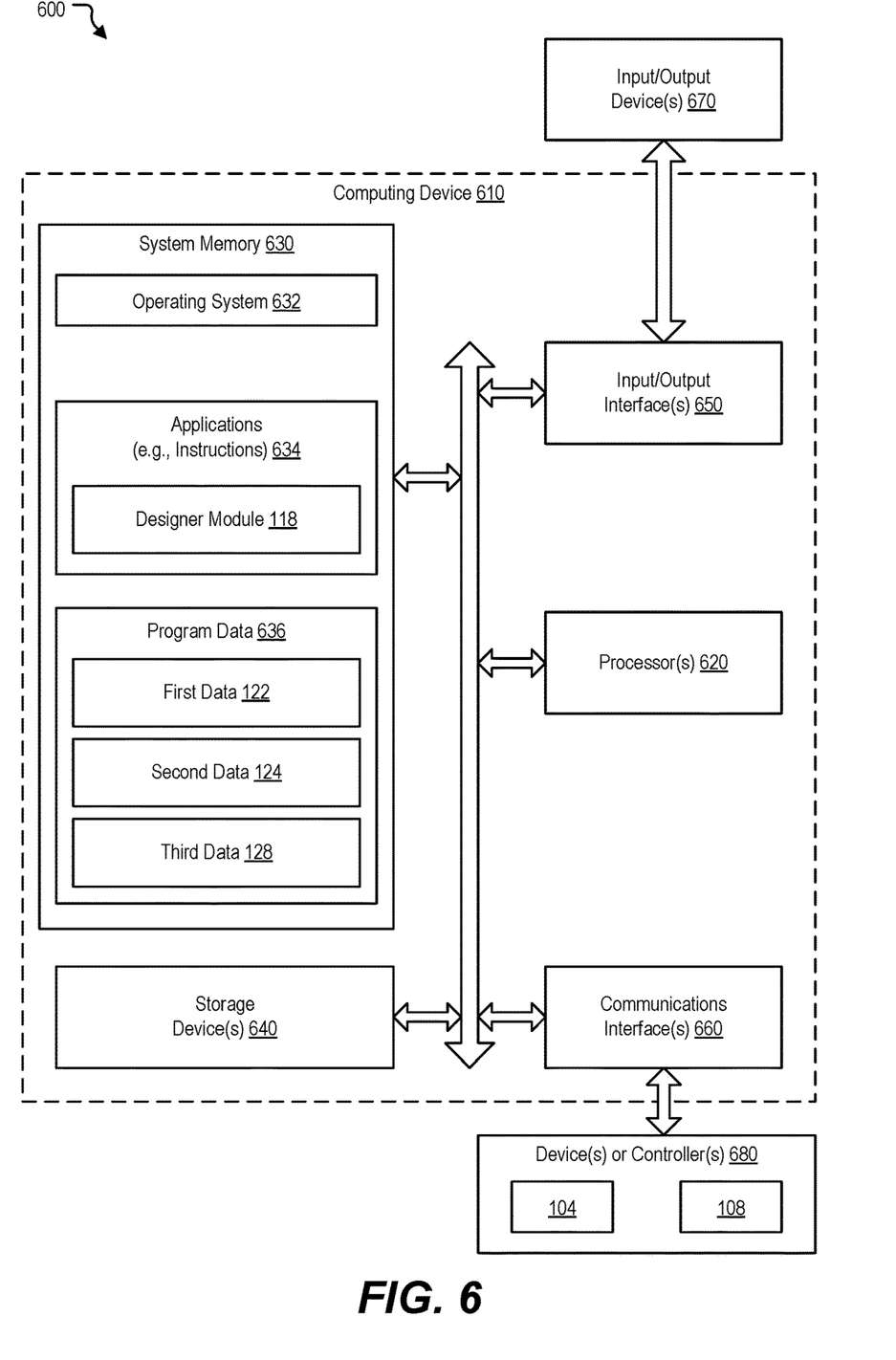
FIG. 6 is a block diagram of a computing environment including a computing device configured to support aspects of computer-implemented methods and computer-executable program instructions (or code) according to the present disclosure.

FIG. 6 is a block diagram of a computing environment 600 including a computing device 610 configured to support aspects of computer-implemented methods and computer-executable program instructions (or code) according to the present disclosure. For example, the computing device 610, or portions thereof, is configured to execute instructions to initiate, perform, or control one or more operations described with reference to FIGS. 1-5.

The computing device 610 includes one or more processors 620. The processor(s) 620 are configured to communicate with system memory 630, one or more storage devices 640, one or more input/output interfaces 660, one or more communications interfaces 660, or any combination thereof. The system memory 630 includes volatile memory devices (e.g., random access memory (RAM) devices), nonvolatile memory devices (e.g., read-only memory (ROM) devices, programmable read-only memory, and flash memory), or both. The system memory 630 stores an operating system 632, which may include a basic input/output system for booting the computing device 610 as well as a full operating system to enable the computing device 610 to interact with users, other programs, and other devices. The system memory 630 stores system (program) data 636, such as the first data 122, the second data 124, the third data 128, other data, or a combination thereof.

The system memory 630 includes one or more applications 634 (e.g., sets of instructions) executable by the processor(s) 620. As an example, the one or more applications 634 include instructions executable by the processor(s) 620 to initiate, control, or perform one or more operations described with reference to FIGS. 1-10. To illustrate, the one or more applications 634 include instructions executable by the processor(s) 620 to initiate, control, or perform one or more operations described with reference to the design module 118, the design device 102, the manufacturing tool 104, the machine learning device 108, or a combination thereof.

In a particular implementation, the system memory 630 includes a non-transitory, computer readable medium storing the instructions that, when executed by the processor(s) 620, cause the processor(s) 620 to initiate, perform, or control operations to aid in design of an object. The operations include receiving, by a processor, first data representing a design of an object to be manufactured. The operations include obtaining, by the processor, second data representing a machine-learning model, the machine-learning model representative of production data and based at least partially on object features, process parameters, environmental factors, and quality data. The operations include, based on the first data and the second data, automatically generating, by the processor, third data indicating at least one of a modification to the design of the object or process conditions for production of the object, and sending the design of the object, the process conditions, or both, to a manufacturing tool to enable production of the object.

The one or more storage devices 640 include nonvolatile storage devices, such as magnetic disks, optical disks, or flash memory devices. In a particular example, the storage devices 640 include both removable and non-removable memory devices. The storage devices 640 are configured to store an operating system, images of operating systems, applications (e.g., one or more of the applications 634), and program data (e.g., the program data 636). In a particular aspect, the system memory 630, the storage devices 640, or both, include tangible computer-readable media. In a particular aspect, one or more of the storage devices 640 are external to the computing device 610.

The one or more input/output interfaces 650 that enable the computing device 610 to communicate with one or more input/output devices 670 to facilitate user interaction. For example, the one or more input/output interfaces 650 can include a display interface, an input interface, or both. The processor(s) 620 are configured to communicate with devices or controllers 680 via the one or more communications interfaces 660. For example, the one or more communications interfaces 660 can include a network interface. The devices or controllers 680 can include, for example, the manufacturing tool 104, the machine learning device 108, one or more other devices, or any combination thereof.

In conjunction with the described systems and methods, an apparatus for aiding in design of an object is disclosed that includes means for automatically generating, based on first data representing a design of an object to be manufactured and second data representing a machine-learning model, third data indicating at least one of a modification to the design of the object or process conditions for production of the object, where the machine-learning model is representative of production data and based at least partially on object features, process parameters, environmental factors, and quality data. In some implementations, the means for automatically generating third data corresponds to the design device 102, the processor 112, the computing device 610, the processor(s) 620, one or more other device, or a combination thereof, which in an illustrative implementation can operate as described with reference to FIG. 2.

The apparatus also includes means for sending the design of the object, the process conditions, or both, to a manufacturing tool to enable production of the object. For example, the means for sending can correspond to the one or more communications interfaces 660 of FIG. 6, one or more other devices configured to send data to a manufacturing tool, or a combination thereof.

In some implementations, a non-transitory, computer readable medium stores instructions that, when executed by a processor, cause the processor to initiate, perform, or control operations to perform part or all of the functionality described above. For example, the instructions may be executable to implement one or more of the operations or methods of FIGS. 1-6. In some implementations, part or all of one or more of the operations or methods of FIGS. 1-6 may be implemented by one or more processors (e.g., one or more central processing units (CPUs), one or more graphics processing units (GPUs), one or more digital signal processors (DSPs)) executing instructions, by dedicated hardware circuitry, or any combination thereof.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. A method for manufacturing an object, the method comprising: using a processor to perform the steps of:
   receiving first data representing a first design of the object to be manufactured;
   obtaining second data representing a machine-learning model, the machine-learning model representative of production data and based at least partially on one or more of: object features relating to a geometry of the object, process parameters, environmental factors, and quality data indicative of observed defects, and the machine-learning model comprising a classifier to determine one or more values associated with manufacture of the first design of the object used to identify a source of one or more potential defects in the manufacture of the object using the first design, wherein the classifier comprises a set of weights that define a trained neural network, and the classifier is configured to detect an estimated defect rate of the one or more potential defects exceeding a threshold amount as determined by the trained neural network;
   in response to a determination that at least one of the one or more values fails to satisfy the threshold amount, generating third data using the first data and the second data, wherein the third data indicates at least one of a modification to the first design of the object or process conditions for production of the object including a change to at least one of the one or more object features relating to the geometry of the object, the process parameters, the environmental factors, and the quality data indicative of observed defects;

determining a second design of the object based on the third data to lower the estimated defect rate below the threshold amount; and sending the second design of the object, the process conditions, or both, to a manufacturing tool to enable production of the object.

2. The method of claim 1, wherein the machine-learning model is updated using globally dispersed production data, wherein the estimated defect rate comprises a predicted defect rate determined based at least in part on a relationship between one or more of the object features relating to a geometry of the object, the process parameters, the environmental factors, and the quality data indicative of observed defects across the globally dispersed production data.

3. The method of claim 1, further comprising using the processor to perform the step of generating data indicative of a supply chain dispersion estimate, floor space estimate, or cost estimate based on the first design and the second data.

4. The method of claim 1, wherein the production of the object includes an automated fiber placement (AFP) process.

5. The method of claim 1, wherein the modification includes adjusting at least one of an object geometry or a ply angle.

6. The method of claim 1, wherein the process parameters include at least one of temperature, pressure, tension, or roller type.

7. The method of claim 1, wherein the environmental factors include at least one of ambient temperature or humidity.

8. The method of claim 1, wherein the quality data comprises data indicative of observed defects in produced objects including at least one of locations, numbers, and types of the observed defects, and further comprising providing feedback including generating a proposed design change as the modification by testing one or more alternative designs to identify one or more potential modifications to lower the estimated defect rate below the threshold amount.

9. The method of claim 1, wherein the object features include regions of curvature.

10. The method of claim 1, wherein the process conditions include temperature, tension, roller type, compaction force, or any combination thereof.

11. A system to aid in design for manufacturing an object, the system comprising:

a memory configured to store instructions; and a processor configured to:

receive first data representing a first design of the object to be manufactured and second data representing a machine-learning model, wherein the machine-learning model is representative of production data and based at least partially on one or more of: object features relating to a geometry of the object, process parameters, environmental factors, and quality data indicative of observed defects, and wherein the machine-learning model comprises a classifier to determine one or more values associated with manufacture of the first design of the object used to identify a source of one or more potential defects in the manufacture of the object using the first design, wherein the classifier comprises a set of weights that define a trained neural network, and the classifier is configured to detect an estimated defect rate of the one or more potential defects exceeding a threshold amount as determined by the trained neural network; and execute the instructions to, in response to a determination that at least one or more values fails to satisfy the threshold amount, generate third data using the first data and the second data, wherein the third data indicates at least one of a modification to the first design of the object or process conditions for production of the object including a change to at least one of the one or more object features relating to the geometry of the object, the process parameters, the environmental factors, and the quality data indicative of observed defects, determine a second design of the object based on the third data to lower the estimated defect rate below the threshold amount, and send the second design of the object, the process conditions, or both, to a manufacturing tool to enable production of the object.

12. The system of claim 11, wherein the production of the object includes an automated fiber placement (AFP) process.

13. The system of claim 11, wherein the modification includes adjusting at least one of an object geometry or a ply angle.

14. The system of claim 11, wherein the process parameters include at least one of temperature, pressure, tension, or roller type.

15. The system of claim 11, wherein the environmental factors include at least one of ambient temperature or humidity.

16. The system of claim 11, wherein the quality data includes data indicative of observed defects in produced objects, and wherein the object features include regions of curvature.

17. The system of claim 11, wherein the object includes an aircraft, a component of an aircraft, a vehicle or structure, a component of a vehicle or structure, or any combination thereof.

18. The system of claim 11, wherein the process conditions include temperature, tension, roller type, compaction force, or any combination thereof.

19. A non-transitory computer-readable medium storing instructions executable by a processor to enable production of an object by performing operations comprising: receiving first data representing a first design of the object to be manufactured; obtaining second data representing a machine-learning model, the machine-learning model representative of production data and based at least partially on one or more of: object features relating to a geometry of the object, process parameters, environmental factors, and quality data indicative of observed defects, and the machine-learning model comprising a classifier to determine one or more values associated with manufacture of the first design of the object used to identify a source of one or more potential defects in the manufacture of the object using the first design, wherein the classifier comprises a set of weights that define a trained neural network, and the classifier is configured to detect an estimated defect rate of the one or more potential defects exceeding a threshold amount as determined by the trained neural network; in response to a determination that at least one of the one or more values fails to satisfy the threshold amount, generating third data using the first data and the second data, wherein the third data indicates at least one of a modification to the first design of the object or process conditions for production of the object including a change to at least one of the one or more object features relating to the geometry of the object, the process parameters, the environmental factors, and the quality data indicative of observed defects; determining a second design of the object based on the third data to lower the estimated defect rate below the threshold amount; and sending the second design of the object, the process conditions, or both, to a manufacturing tool to enable production of the object.

20. The non-transitory computer-readable medium of claim 19, wherein the modification includes adjusting at least one of an object geometry or a ply angle, wherein the process parameters include at least one of temperature, pressure, tension, or roller type, and wherein the environmental factors include at least one of ambient temperature or humidity.

\* \* \* \* \*